United States Patent [19]

Halpern

[11] Patent Number: 4,674,306

[45] Date of Patent: Jun. 23, 1987

[54] VEHICLE AND ASSEMBLY LOCKING AND WRENCHING APPARATUS

[76] Inventor: Offer Halpern, c/o Rosenfeld - 176 E. 70th St., New York, N.Y. 10021

[21] Appl. No.: 776,574

[22] Filed: Sep. 16, 1985

[51] Int. Cl.[4] .......................... B62H 5/00; E05B 71/00
[52] U.S. Cl. .......................................... 70/233; 70/18; 70/409; 70/167; 70/DIG. 57
[58] Field of Search ..................... 70/233, 409, 51, 52, 70/53, 57, 58, DIG. 57, 18, 229, 230, 232, 231; 81/436; 411/910, 919; 280/289 L; 301/111, 114, 115

[56] References Cited

U.S. PATENT DOCUMENTS

| | | | |
|---|---|---|---|
| 786,586 | 4/1905 | Moreland | 70/51 |
| 2,507,875 | 5/1950 | Williams | 70/57 |
| 2,797,572 | 7/1957 | Prall | 70/259 |
| 3,965,708 | 6/1976 | Smiley | 70/259 |
| 4,037,438 | 7/1977 | Miller | 70/DIG. 57 |
| 4,064,716 | 12/1977 | Shwayder et al. | 70/52 |
| 4,085,600 | 4/1978 | Bindari | 70/51 |
| 4,155,231 | 5/1979 | Zane et al. | 70/18 |
| 4,193,276 | 3/1980 | Lundberg | 70/409 |
| 4,230,283 | 9/1981 | Labrecque | 70/167 |
| 4,324,119 | 4/1982 | Mitton | 70/53 |

FOREIGN PATENT DOCUMENTS 181205  2/1936  Switzerland ........................... 70/409

*Primary Examiner*—Gary L. Smith
*Assistant Examiner*—Vinh Luong
*Attorney, Agent, or Firm*—Lieberman, Rudolph and Nowak

[57] ABSTRACT

A vehicle and assembly locking and wrenching apparatus is provided by replacement nuts each having an incised front face and arcuate sides parallel to the face, surrounded by cylindrical, annular rings that prevent the gripping and turning of the nuts. Provision is also made for a coupling having a fitting that possesses projected walls complementary to the channels incised on the faces of the nuts, such that upon insertion of a fitting into a nut, engagement is provided for the attachment or removal of the nut by turning. A vehicle-and-assembly locked mode is created when removable assemblies are attached with the replacement fasteners, the coupling is attached to a U-shaped lock around the end opposite to the cylindrical locking mechanism for the U-shaped lock, and the U-shaped lock is locked around the vehicle and a stationary object. Provision is also made for a second annular ring for fitting around the bore left open on the axle of a front bicycle tire after the quick release armature and cover cap are removed.

2 Claims, 8 Drawing Figures

VEHICLE AND ASSEMBLY LOCKING AND WRENCHING APPARATUS

BACKGROUND OF THE INVENTION

This invention relates generally to an apparatus that can be attached to a vehicle, and that will prevent theft of both the vehicle and assemblies fastened by screws or nuts and bolts thereto, and more specifically to replacement fasteners that are uniquely configured, and to a specific wrench having a key that alone can remove these fasteners.

Of late, commuters have sought the use of small and efficient vehicles, including bicycles, mopeds and motorcycles, to travel in cities and other congested areas. Unfortunately, these vehicles are subject to theft in their entirety, or theft of component assemblies and parts. Accordingly, there has been an increasing need to develop secure locking mechanisms, that are easily accessible to the authorized user, yet prevent theft throught the removal of these mechanisms by the use of bolt cutters, screw drivers, vice-grips and other tools.

Generally, security is provided to these vehicles through the use of a number of different types of locking mechanisms, including traditional, heavy, and bulky chains that can be threaded through the vehicle's wheels and frame, and attached to a fixed object, like a sign post or mail box. Not only does the size and weight detract from the use of such locking mechanisms, but as well, chains are ordinarly disadvantageous since they can be cut and removed by bolt cutters.

One device that identifies the problems attendant with unauthorized removal of wheels from a bicycle or similar vehicle is disclosed in U.S. Pat. No. 4,324,119 to Mitton. The Mitton wheel lock device comprises a body member having a lock of cylindrical design and attachable to the wheel axle by screwing the member to the threaded end of the axle adjacent to the wheel retaining nut, and a looped securing member that is slipped around the frame and inserted and locked into complementary recesses in the body member.

A successful solution to some of these attendant problems is disclosed in U.S. Pat. No. 4,155,231 to Zane, et al., in which a locking device comprises a U-shaped shackle locking to a cross-piece, such that the shackle can be slipped through the frame and rear wheel of a vehicle, and locked around a post. This device is commercially available under the name "Kryptonite-4". One disadvantage of the Kryptonite-4 is that it fails in its ordinary operation to hook through and retain all but the frame and rear wheel (see patentees' FIG. 4), thereby failing to safeguard against the theft of the remaining unlocked assemblies, including the front wheel, seats, and handlebars. Accordingly, most users of the Kryptonite-4 risk the loss of these assemblies. One solution is a "quick release" device that allows for the rapid and convenient removal of the front wheel, through pivoting of the quick release armature, thereby releasing the shaft that connects the front wheel axle from the front end fork of the frame. The user must remove the front wheel with the quick release, and either carry it around with him, or place this wheel in very close proximity to the rear tire, such that the U-shaped shackle can slip through both tires, and around the post. Alternatively, the user can purchase and apply two U-shaped locks. Heretofore, there appears to have been no device available for safeguarding any of the other assemblies when using the Kryptonite-4, including the seat and handlebars. Removal of these assemblies also heretofore required the use of a separate and distinct wrench, the Kryptonite-4 being used solely as a locking device.

Another locking device is disclosed in U.S. Pat. No. 3,241,408 to McCauley. McCauley discloses a replacement vehicle wheel nut or bolt possessing a front elevational face having a curvilinear channel of unique design, and a key having a complementary front facial projection that can be inserted into the channel of the nut or bolt. When the user replaces the nuts or bolts on a vehicle wheel with McCauley's device, attachment and removal of same can only be performed by engagement of the key through use of a ratchet-driver, or other wrench to hold and leverage the key.

Accordingly, use of McCauley's device produces a variety of attendant problems. First, the user must carry around the special key with him, for without it, the replacement nuts or bolts cannot be removed, and when left with the vehicle, may be discovered and used in an unauthorized manner. Second, should the user lose this key, or not have it with him, it will be impossible to remove the wheels, as they are attached with the replacement nuts and bolts. Third, the user must carry a ratchet-driver, or other wrenching means, which must be of a sufficient size to provide the leverage necessary to torque the key and the nuts or bolts. Fourth, if these nuts or bolts are used with a wheel of a bicycle, moped or motorcycle, the user must still attach the vehicle to a stationary object, a pole or post, by a locking means, which is neither discussed nor disclosed by McCauley. Thus, the user must at all times carry with him one key for locking the vehicle in general, yet another key for the wheel nuts or bolts, and, as well, a wrench or other tools, in order to insure safety.

The aforementioned problems are effectively eliminated through use of the instantly disclosed and claimed novel vehicle and assembly locking and wrenching apparatus.

It is, therefore, an object of the present invention to provide a locking apparatus for vehicles and assemblies attached thereto, such that the user will only need to carry, at most, one key.

It is also an object of the present invention to provide replacement nuts or bolts that can be attached and removed only when authorized and only through use of a complementary key and wrench that is fastened by means to the vehicle.

It is another object of the present invention to provide such fastening means on a device that also locks the entire vehicle to a stationary pole or post, such that when the object is locked, the key cannot be used.

It is yet another object of this invention to provide said fastening means and vehicle locking device as a wrench such that the proper torque can be applied to the key, when inserted into the locking nuts or bolts, and these nuts or bolts can be attached or removed.

It is still a further object of this invention to provide that the key for the nuts and bolts is always secured to the vehicle, such that it cannot be lost or misplaced, nor used except when authorized.

It is yet a further object of this invention to provide that the nuts or bolts be capable of use on any one or more assemblies of a vehicle.

It is still another object of the present invention to provide for locking of assemblies to vehicles with a minimum of additional weight added.

It is still a further object of this invention to provide a locking apparatus that can operate as a wrench for the removal of assemblies from vehicles, thereby eliminating the need for carrying like or similar tools.

SUMMARY OF THE INVENTION

The foregoing and other objects of the present invention are achieved through the provision of a vehicle and assembly locking and wrenching apparatus wherein fasteners, used to attach the assemblies to the vehicle, are provided with slots of a unique configuration that can only be accessed, engaged and removed via a specific complementary key that is attached to a coupling. The coupling is in turn attached to a vehicle locking apparatus such that when the vehicle is locked, the coupling is inaccessible, and the key cannot be used to remove any of the fastened assemblies. Further provision is also made for utilizing the vehicle lock, and attached coupling and key, as a wrench that enables application of the proper torque for removing the fasteners, and hence the assemblies. Accordingly, when any portion of the vehicle is locked to a stationary object, such as a pole or post, with the vehicle and assembly locking and wrenching apparatus described herein, not only is the vehicle safe from theft, but as well the assemblies are protected. When the owner of the vehicle, or one duly authorized, unlocks the apparatus from the stationary object, he is then capable of removing the assemblies from the vehicle, and can do so with the wrench, as provided herein, and without the need of any additional tools.

BRIEF DESCRIPTION OF THE DRAWINGS

Comprehension of certain embodiments of the invention is facilitated by reading the following detailed description in conjunction with the annexed drawings, in which.

DETAILED DESCRIPTION OF THE PREFERRED EMBODIMENTS

Figure 1:
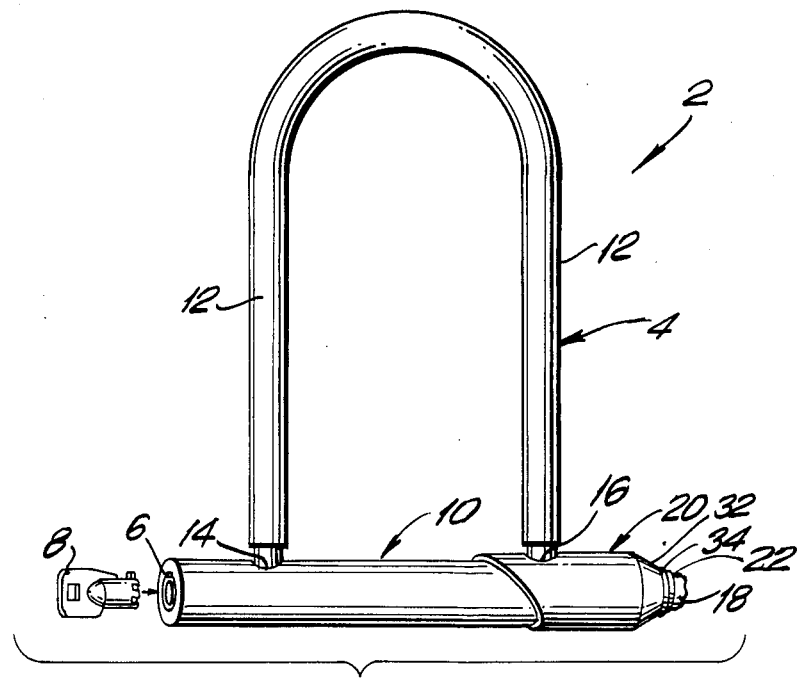
FIG. 1 is a view in perspective of a vehicle locking and wrenching apparatus, in accordance with the invention herein.

FIG. 1 is a view in perspective of a vehicle and locking wrenching apparatus embodiment of the invention. It must be understood that although the embodiment represented in FIG. 1 is preferred herein, any other structure and locking configuration can be used that embodies the inventive aspects herein.

The vehicle locking and wrenching apparatus 2 in FIG. 1 is comprised of a U-shaped shackle having legs 12. Provision is also made for a cross piece 10 with openings 14 into which can be inserted the legs 12. On one end of the cross piece is a conventional rotatable lock 6, of cylindrical design, into which is inserted a vehicle lock key 8. The attachment and locking of legs 12 onto cross piece 10 by lock 6, occurs in any of a number of conventional ways, as are disclosed, at least in part, in U.S. Pat. No. 4,155,231 to Zane, et al., referenced above. On the other end of cross piece 10 is fitted a removable coupling 20. This coupling 20 is a cylindrical tube open on one end, and tapered on the other end. The tapered end terminates in a shoulder 34 that is elevated with respect to the face of the tapered end, upon which is attached a complimentary key 18, the purpose of which will be described below. The complimentary key has continuous projected walls 22.

Figure 2:
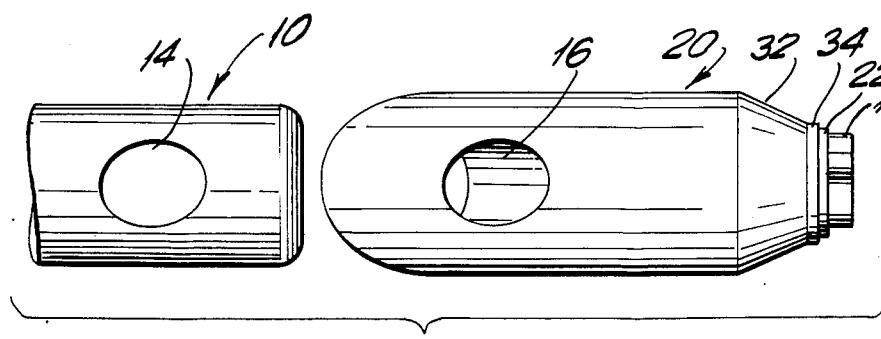
FIG. 2 is a top-elevational view of a key and coupling of a vehicle locking and wrenching apparatus.

FIG. 2 reflects the method of insertion of the end opposite to the rotatable lock 6 of cross piece 10. Coupling 20 has a circular bore 16 upon the arcuate side thereof, which aligns with opening 14 of the cross piece 10, when the coupling 20 is placed thereon, such that leg 12 of the U-shaped shackle can be inserted through said circular bore 16 into said opening 14 of cross piece 10. When coupling 20 is attached in this manner, and the U-shaped shackle 4 is attached to cross piece 10, the vehicle lock key 8, when inserted into rotatable lock 6, will lock the U-shaped shackle 4 to the cross piece 10, simultaneously locking coupling 20 thereto.

Figure 4:
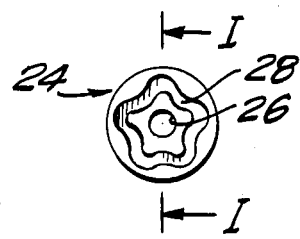
FIG. 4 is front-elevational view of a fastener of an assembly locking apparatus.
Figure 5:
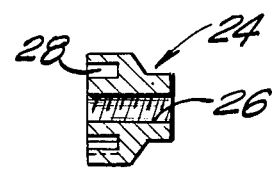
FIG. 5 is a cross-sectional view of a fastener, along line I—I of FIG. 4.

FIG. 4 shows a fastener 24, in this specific embodiment, as a cylindrical circular nut. At the center of fastener 24 is a threaded hole 26, as is also shown in the cross-sectional diagram set forth in FIG. 5, along line I—I of FIG. 4. A curviliner channel 28, devoid of straight line segments, is cut into the front face of fastener 24. It must be understood that the purpose of this curvilinear channel 28 is to provide for the inaccessibility to the insertion of conventional tools, including screwdrivers and chisels. Additionally, curvilinear channel 28 can be of any other geometry, in accordance with the intention and invention herein.

Figure 3:
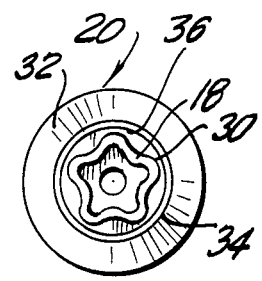
FIG. 3 is a front-elevational view of a key and coupling.

In FIG. 3, complimentary key 18 is comprised of a fitting that is attached to the shoulder 34 on the tapered front end 32 of coupling 20. This complimentary key 18 is designed for insertion into fastener 24, such that key 18 will engage fastener 24, and allow for its removal. Accordingly, key 18 is comprised of projected walls 30, of a continuous curvilinear nature, complimentary to the curvilinear channel 28 of fastener 24. In this manner, projected walls 30, when inserted into curvilinear channel 28, will engage this channel, and allow for the removal of the fastener 24. Also provided in FIG. 3 is hole 36, concentric with tubular coupling 20, and shoulder 34. Hole 36 will allow for the insertion of a threaded bolt as it passes through threaded hole 26 of fastener 24. It must be understood that complimentary key 18 may be provided with any other geometric design, in accordance with the general principles herein.

Figure 6:
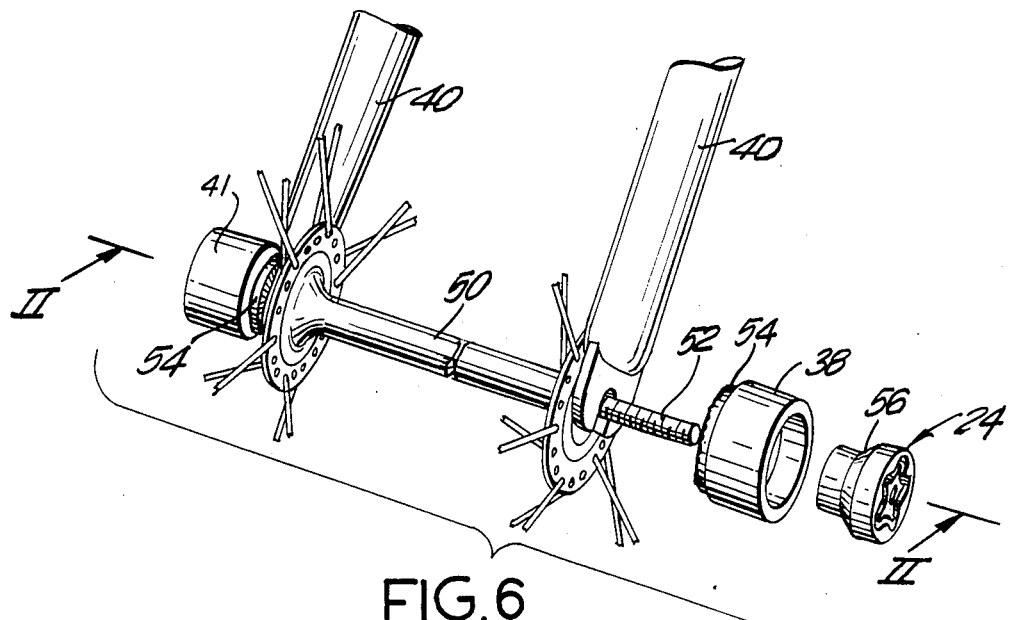
FIG. 6 is a perspective exploded view of an assembly locking apparatus, when applied to a wheel of a bicycle.

FIG. 6 shows a prospective exploded view of a preferred embodiment of the invention therein, in use with a front bicycle wheel.

Figure 7:
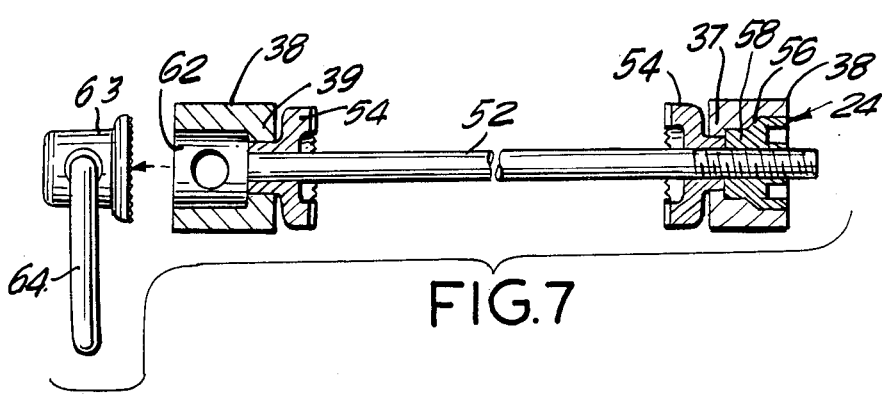
FIG. 7 is a cross-sectional view of the assembly locking apparatus of FIG. 6, along line II—II thereof.

FIG. 7 is a cross-sectional view along line II—II of FIG. 6. A threaded axle member 52 passes through fork 40 of the frame of the bicycle, and through axle 50, and is, in typical form, attached by nuts on both sides of the frame. In the instant embodiment, threaded axle member 52 is shown as part of a quick release axle, in which a quick release armature 64 pivots in the center hole of a quick release cover cap 63 and through the hole of the quick release terminal 62. In accordance with this invention, quick release armature 64 and cover cap 63 are both removed, and can be discarded. Around quick release terminal 62 is herein provided a cylindrical annular cover ring 41 having at the rear portion a wall 39. The cover ring 41 is designed to slip around quick release terminal 62, thereby denying access to this terminal 62. Accordingly, cover ring 38 is comprised of a plastic or metal or combination thereof material, with sufficient rigidity to prevent the gripping of the terminal 62 by use of vice grips, clamps, or pliers, thereby preventing pivoting of the threaded axle member 52 and removal of the wheel.

Similarly, when fastener 24 is screwed onto axle member 52, it is provided with a cyclindrical annular ring 38 comprised of a material, such as a plastic or metal or a combination thereof, that is impervious to the gripping, squeezing and turning of fastener 24 by vice grips, clamps or pliers. The rear flat fact of cylindrical annular ring 38 is as well provided with a wall 37 that grips around the rearward face of fastener 24, thereby preventing the removal of this ring when the fastener is engaged on a threaded axle member.

In the preferred embodiment shown in FIG. 7, the rearward portion of fastener 24 is provided with a tapered conical collar 56, and the ring 38 is provided with a complimentary depression in the cylinder wall 58 such that the ring 38 pivots around said collar 56 of the fastener 24. In this manner, if ring 38 is gripped with vice grips, clamps or pliers, it will pivot, but will not engage the fastener 24. In yet another embodiment, tapered conical collar 56 and depression 58 are separated by a bearing, to further enhance a free spinning action between the ring 38 and the fastener 24. It must be understood that the specific configuration of the ring 38 against the rearward portion of the fastener 24 shown herein is merely a preferred embodiment, and is not intended to limit the general principles of the instant invention. Accordingly, any like or similar configuration, is part and parcel of the instant invention.

Washer 54 in FIGS. 6 and 7 is placed around threaded axle member 52 at the rear face of rings 38 and 41, such that when the fastener 24 is tightened to its fullest extent it will press against washer 54, and washer 54 will in turn press against the fork 40.

In the instance wherein a quick release armature and cover cap and terminal are not utilized, the nuts initially holding the threaded axle member to the fork of the frame are both replaced with fasteners 24 and rings 38. In this manner, it becomes unlikely, if not impossible, to remove fasteners 24 and gain access to the removal of the wheel of the bicycle, except in an authorized manner, through use of the instant invention.

Figure 8:
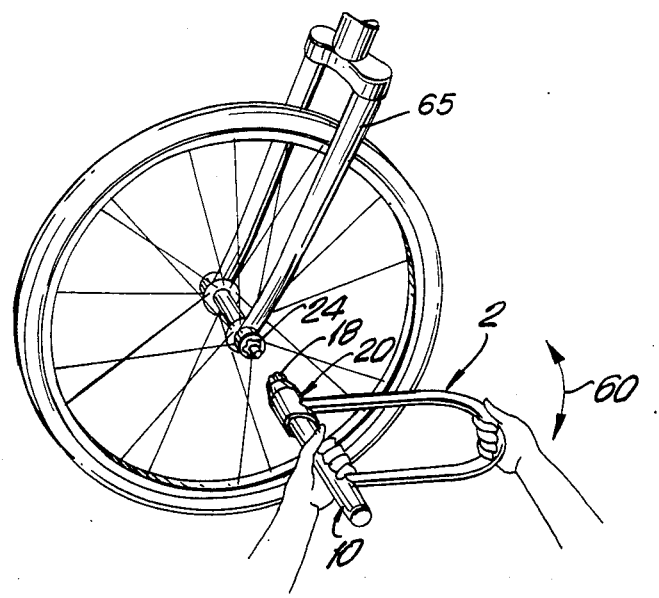
FIG. 8 is a perspective view of the wrenching operation of a specific embodiment of a vehicle and assembly locking and wrenching apparatus.

FIG. 8 represents a perspective view of the use of the vehicle and wrenching locking apparatus 2 for engagement of fastener 24 on bicycle 65. As is shown, an authorized user of the instant apparatus can grip the cross piece 10 as a lever arm of the apparatus 2 with one hand, the U-shaped shackle 4 with the other hand, can align the key 18 and coupling 20 with channel 28 of fastener 24 on bicycle 65, can insert said key into said fastener, and can torque said fastener by pivoting the U-shaped shackle 4 on the cross piece 10. This torque action 60 enables the user to either tighten or loosen the fastener, thereby either fixing the wheel to the frame 40, or allowing for its removal.

Thus, the user of the instantly claimed apparatus can replace every assembly on a bicycle that is attached by nuts with fasteners 24, and can prevent access to these assemblies except by use of the vehicle locking and wrenching apparatus 2, with complimentary key 18. When the user desires to lock his vehicle, he simply disengages shackle 4 from cross piece 10, slides shackle 4 through any portion of his vehicle, and around a stationary pole or object, locks cross piece 10 to shackle 4 through use of vehicle lock key 8, and need only carry vehicle lock key 8 with him.

When the vehicle is locked in this manner, the key and coupling 18 and 20 are inaccessible, and cannot be applied to the fasteners 24, unless and until the vehicle locking apparatus 2 is first removed. Accordingly, protection of the vehicle and assemblies in this vehicle-and-assembly-locked-mode is thereby provided.

When the user returns to his vehicle, he need merely unlock cross piece 10 with vehicle lock key 8, remove the vehicle locking and wrenching apparatus 2, which automatically has attached thereto complimentary key 18 on coupling 20, and can at that point remove one or more of the assemblies attached to the vehicle. Such removal is further facilitated through application of the vehicle locking and wrenching apparatus 2 to provide torque 60, as a wrench, in the vehicle-and-assembly-unlocked-mode.

The instant invention can accordingly be utilized with any vehicle for which safety and assurance against theft are required. It must be further understood that the specific structures herein are disclosed in the figures as specific embodiments, and can carry any other form that meets and satisfies the principles of the invention herein. Accordingly, although the invention has been described in terms of the specific embodiments and applications, persons skilled in the art, in light of these teachings, can generate additional embodiments without exceeding the scope or departing from the spirit of the claimed invention. It is to be further understood that the drawings and the descriptions in this disclosure are preferred to facilitate the comprehension of the invention and should not be construed to limit the scope thereof.

I claim:

1. A vehicle locking and wrenching apparatus for use on a bicycle, said apparatus removably attached to the bicycle and comprising of:
   a quick release armature;
   cover cap;
   threaded axle member with a quick release terminal;
   a substantially cylindrical, circular replacement nut having arcuate sides perpendicular to its flat face, the nut incised on its face with a curvilinear channel that is substantially devoid of straight line segments, the nut attached to a threaded end of said threaded axle member;
   a first cylindrical, annular ring fitted to turn freely around substantially the entire surface area of the arcuate sides of the nut perpendicular to the flat face of the nut, the first ring of a sufficient thickness and strength to prevent the gripping and turning of the nut when forces are applied to the first ring;
   a second cylindrical, annular ring, fitted to turn freely around the quick release terminal of the threaded axle member after the quick release armature and cover cap are removed, said second ring having sufficient thickness and strength to prevent the gripping and turning of said threaded axle member when forces are applied to said second ring;
   a cylindrical, tubular coupling having arcuate sides, said coupling open on one end, and tapered on the other end, with a circular bore on the arcuate side proximate to the open end, wherein said tapered end terminates in an elevated shoulder upon which a fitting is fixedly attached, the face of said fitting comprising continuous projected walls complementary to the curvilinear channel of the nut, such that there is provided a snug fit when the face of the fitting is inserted into the channel of the nut;

a bicycle locking device comprising a U-shaped shackle with legs that attach by insertion into a first opening and a second opening on a cross piece, and which is in turn locked by conventional cylindrical locking means, wherein said cross piece is removably inserted into said open end of said coupling such that said first opening on the cross piece aligns with the bore on the coupling and one leg of said shackle can be inserted and locked conventionally through said bore and said first opening, and further wherein upon insertion of the face of the fitting into the channel of the nut, while said coupling is locked to the cross piece, a lever arm is created by application of torque upon said U-shaped shackle for removing or tightening the nut.

2. A vehicle locking and wrenching apparatus for use on a bicycle, said apparatus removably attached to the bicycle and comprising of:

at least one substantially cylindrical, circular replacement nut, each nut having arcuate sides perpendicular to its flat face, each nut incised on its face with a cirvilinear channel that is substantially devoid of straight line segments, each nut adapted to be attached to a bolt;

at least one cylindrical, annular ring, each ring fitted to turn freely around substantially the entire surface area of the arcuate sides of each nut perpendicular to the flat face of each nut, each ring of a sufficient thickness and strength to prevent the gripping and turning of each nut when forces are applied to each ring;

a cylindrical, tubular coupling having arcuate sides, said coupling open on one end, and tapered on the other end, with a circular bore on the arcuate side proximate to the open end, wherein said tapered end terminates in an elevated shoulder upon which a fitting is fixedly attached, the face of said fitting comprising continuous projected walls complementary to the curvilinear channel of each nut, such that there is provided a snug fit when the face of the fitting is inserted into the channel of each nut;

a bicycle locking device comprising a U-shaped shackle with legs that attach by insertion into a first opening and second opening on a cross piece, and which is in turn locked by conventional means, wherein said cross piece is removably inserted into said open end of said coupling such that said first opening on the cross piece aligns with the bore on the coupling and one leg of said shackle can be inserted and locked conventionally through said bore and said first opening, and further wherein upon insertion of the face of the fitting into the channel of each nut, while said coupling is locked to the cross piece, a lever arm is created by application of torque upon said U-shaped shackle for removing or tightening each nut.

* * * * *